United States Patent
Holtan et al.

(10) Patent No.: US 6,880,652 B2
(45) Date of Patent: Apr. 19, 2005

(54) CART PULLING VEHICLE WITH DUAL CABLE DRUMS AND DUAL TORSION SPRINGS

(75) Inventors: Paul D. Holtan, Savage, MN (US); Daniel T. Johnson, Wayzata, MN (US)

(73) Assignee: Dane Industries, Inc., Plymouth, MN (US)

( * ) Notice: Subject to any disclaimer, the term of this patent is extended or adjusted under 35 U.S.C. 154(b) by 67 days.

(21) Appl. No.: 10/457,727

(22) Filed: Jun. 9, 2003

(65) Prior Publication Data

US 2004/0245030 A1    Dec. 9, 2004

(51) Int. Cl.[7] .............................................. B62D 53/00
(52) U.S. Cl. ................................ 180/19.2; 280/33.991
(58) Field of Search .............................. 180/14.1, 19.1, 180/19.2, 11; 280/33.991, 33.992; 414/469; 242/378.4, 382.5, 384.2, 388.6, 388.7, 372

(56) References Cited

U.S. PATENT DOCUMENTS

| | | | | |
|---|---|---|---|---|
| 4,289,212 A | * | 9/1981 | Immel | 180/19.1 |
| 4,970,882 A | * | 11/1990 | Arrendondo | 70/30 |
| 5,082,074 A | * | 1/1992 | Fischer | 180/11 |
| 5,322,306 A | * | 6/1994 | Coleman | 280/33.992 |
| 5,791,669 A | * | 8/1998 | Broddon et al. | 280/47.34 |
| 5,860,485 A | * | 1/1999 | Ebbenga | 180/19.2 |
| 5,897,039 A | * | 4/1999 | Swenke | 224/162 |
| 5,934,694 A | | 8/1999 | Schugt et al. | |
| 6,220,379 B1 | * | 4/2001 | Schugt et al. | 180/65.1 |
| 6,244,366 B1 | * | 6/2001 | Otterson et al. | 180/11 |
| 6,260,643 B1 | * | 7/2001 | Schuchardt | 180/14.1 |

* cited by examiner

Primary Examiner—Anne Marie Boehler
(74) Attorney, Agent, or Firm—Thomas J. Nikolai; Nikolai & Mersereau, P.A.

(57) ABSTRACT

A cart pulling vehicle for use in parking lots made up of a hand operated motor-driven base which pulls shopping carts. The device utilizes a cable that is retractably mounted on the base and stretches to surround the line of carts pulled. This cable is retracted by a pair of cable drums at its ends which are driven by torsion springs. These separate dual torsion springs place torque on the cable drums which, in turn, exert tension on each half of the cable. When the cart pulling vehicle is in motion, a lock arrangement prevents additional cable from unreeling which the tension on each side cable pulling the carts in a train-like fashion. When the vehicle is stopped, a lock is released and the cable is able to extend to surround additional carts.

47 Claims, 10 Drawing Sheets

CART PULLING VEHICLE WITH DUAL CABLE DRUMS AND DUAL TORSION SPRINGS

BACKGROUND OF THE INVENTION

I. Field of the Invention

This invention relates generally to a motorized vehicle for pulling shopping carts, and more particularly to a cart pulling vehicle with dual cable drums and dual torsion springs.

II. Discussion of the Prior Art

In the past, collection of shopping carts from parking lots was done by manual pushing of a string of carts by a store employee. As these carts were retrieved, the line of carts being pushed would grow longer and more difficult to maintain control. Two workers were required, one at the rear of the string to push and one at the front to steer. Therefore, the number of carts that were retrieved at one time was comparatively limited. Not only was this manual process time-consuming and manpower intensive, it was also a strenuous activity requiring physical strength and agility.

In response to the difficulty experienced in retrieving shopping carts, several motorized devices began to be utilized. One such device is disclosed in U.S. Pat. No. 6,220,379. This device is basically a small electrically powered cart which can be either driven or operated by remote control. The device uses a pushing from the rear technique.

Another, more closely related, prior art design uses a rope extending from a motorized vehicle to the last cart in a line to pull the carts in a train-like fashion. These prior pulling machines generally have two rope play-out and take-up drums on a common shaft and a single torsion reaction spring with a single lock mechanism. The lock mechanism is controlled by switch when the handle is placed in working position. A rope extends from one drum out the rear of the machine to a rope pull and is returned to the drum on the other side of the machine. This device allows the rope to be free to extend or retract when the lock is engaged. Unfortunately, this design has a substantial number of problems. Because the single torsion spring is attached to both drums, tension is only provided to the side with the tightest length of rope. Often the other length of rope does not have enough tension to keep it from dragging on the ground, especially when rounding corners. While this problem is intended to be addressed with the pulleys, they prove to be only marginally effective due to friction and rotational resistance. The lack of tension on one side often causes the rope on that side to unspool from its drum. Torsion spring life also is a problem due to limited space on the machine, the fact that the spring is on a common shaft with the drums, and the large number of extend/retract cycles to which the machine and spring are subjected. Finally, the rope used is also a problem because the rope is heavy and bulky to withstand the load exerted by the carts and is vulnerable to the negative effects of rubbing.

Therefore, what is needed is the cart pulling vehicle of the present invention which effectively eliminates the requirements of physical strength and agility without the tension, torsion spring life, and rope problems of the past.

SUMMARY OF THE INVENTION

The present invention provides for a cart pulling vehicle for use in parking lots everywhere. The cart pulling vehicle is made up of a hand-operated, motor-driven base which pulls shopping carts with a cable that is retractably mounted on the base and stretches to surround the line of carts being pulled. This cable is wrapped around a pair of cable drums at its opposite ends. Separate dual torsion springs for each drum place torque on the cable drums which, in turn, exert tension on the length of cable spanning each side of the string of shopping carts. A lock mechanism prevents the cable from unreeling when the vehicle is in motion while the tension of each side cable pulls the carts in a train-like fashion. When the vehicle is stopped, a lock disengages the cable tension and the cable is able to be pulled from the drums so that additional shopping carts can be added to the already assembled string of carts.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements for cart pulling vehicles. The embodiments herein are intended to be taken as representative of those in which the invention may be incorporated and are not intended to be limiting.

Figure 1:
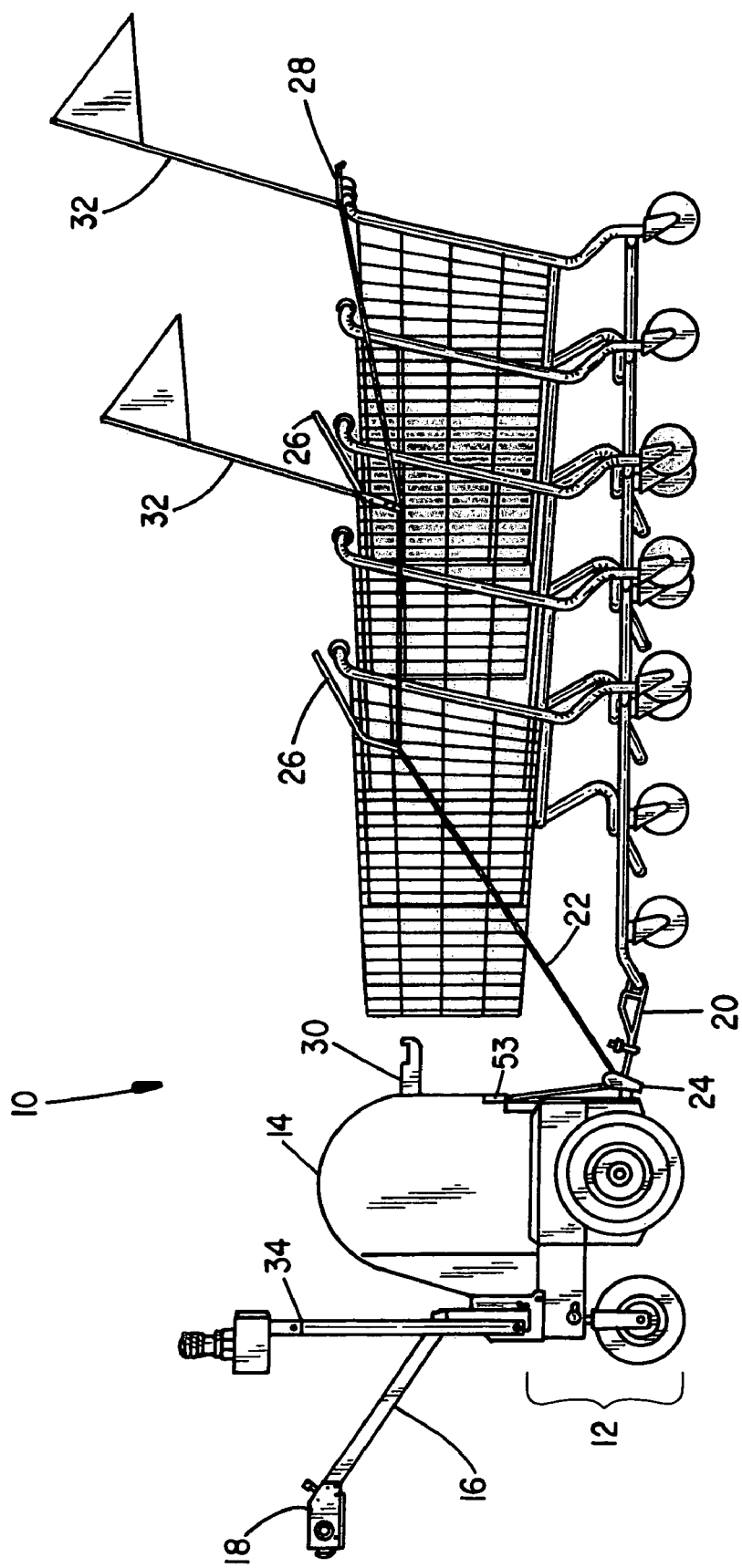
FIG. 1 is a side view of the cart pulling vehicle of the present invention.

Referring first to FIG. 1, there is shown a side view of the cart pulling vehicle along with a string of nested carts to be transported by the vehicle. The assembly itself is indicated generally by numeral 10. It includes a motor-driven base 12, a cable reel cover 14, a steering arm 16, a vehicle motor control box 18, a cart hitch assembly 20, a cable 22, cable routing pulleys 24, cable guides 26, a pull handle 28, handle and guide storage bracket 30, visibility flags 32, and visibility beacon 34.

Figure 2:
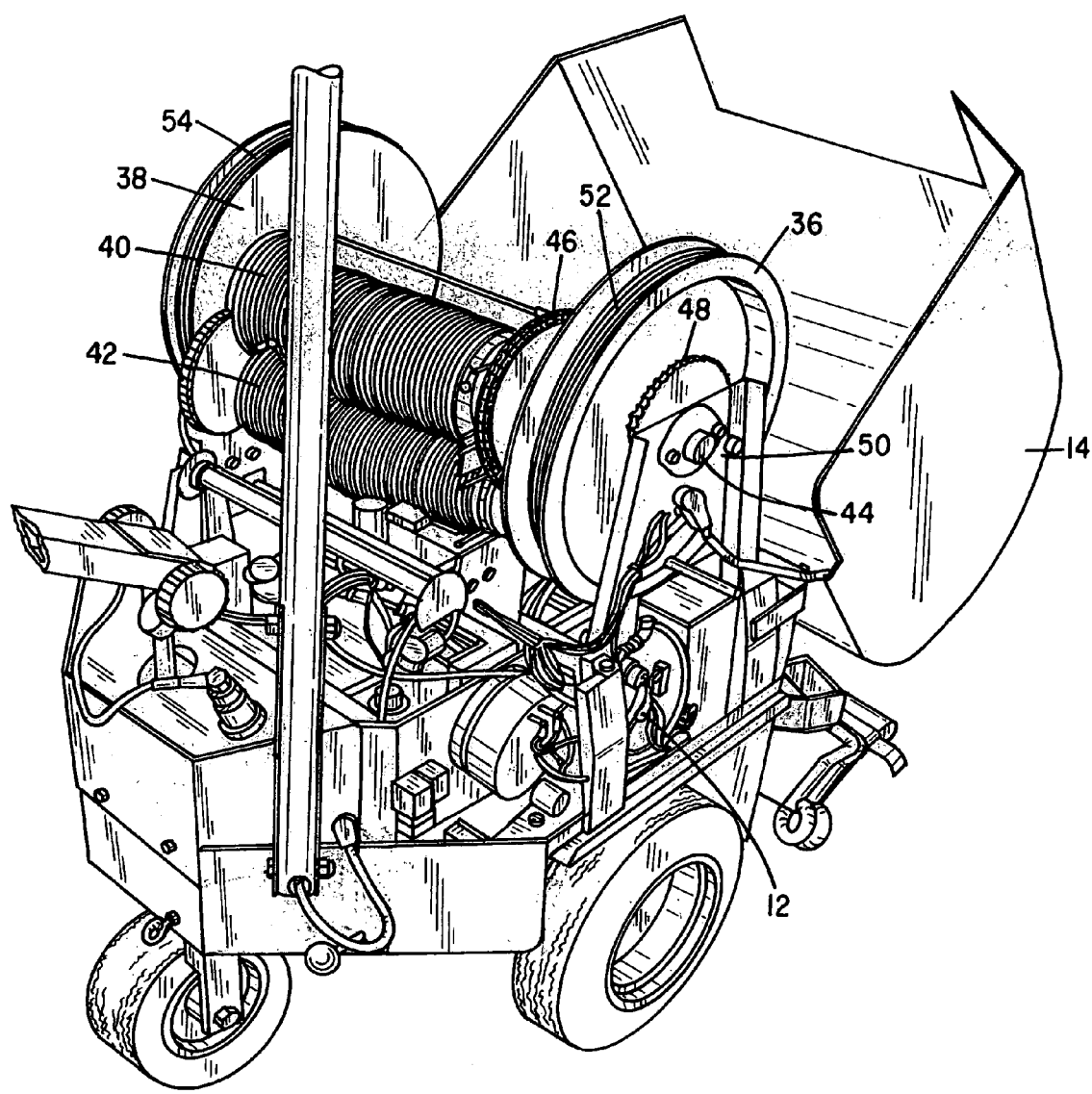
FIG. 2 is a perspective view of the internal components of the cart pulling vehicle.

With reference to FIG. 2, the cart pulling vehicle is seen in a perspective view with its cable cover 14 lifted, allowing a more detailed examination of the vehicle's internal features. The cable reel cover 14 is flipped open about a hinge and the internal components are exposed. The internal components include cable drums 36 and 38, cable springs 40 and 42, a first drum shaft 44 for the drum 36, large sprockets 46, outer sprockets 48, and brackets 50. All of these features are mounted above the motor-driven base 12 and contained within the cable reel cover 14. In that the present invention is not directed to the dc motor drive for the vehicle's wheels, there is no need to describe these features.

Generally, the cable 22 wraps around the center spindle 52 of one of the drums 36, extends out from opening 53 in the back of cover 14, loops through pulley 24 on the vehicle's base, stretches around the collected shopping carts in a manner described more particularly below, back under the cover 14, and around the center spindle 54 of drum 38. The cable springs 40 and 42 are principally responsible for producing independent torque on each of the cable drums 36 and 38, thus causing simultaneous tension pulling on both ends of the cable 22. A more complete explanation of the working of these components will be discussed in detail later.

It is also possible to view some of the components of the motor-driven base 12 in FIG. 2, including its conventional battery, motor, wiring etc., although, as mentioned, these will not be discussed in detail.

Figure 3:
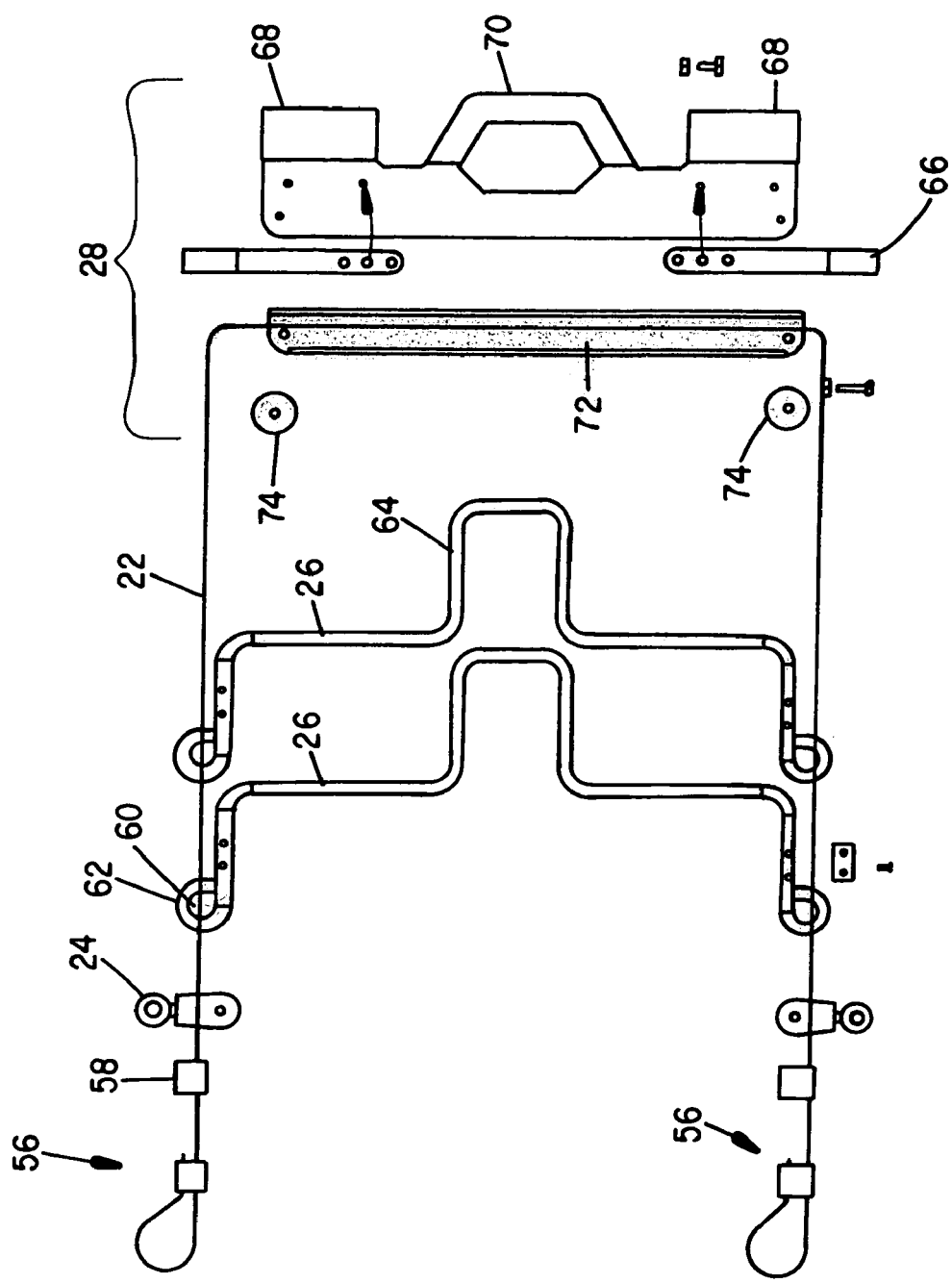
FIG. 3 is a top view of the cable routing layout and unassembled cable pull handle.

FIG. 3 shows a top view of the cable routing layout and unassembled cable pull handle. This figure is intended to disclose a schematic of the locations where the cable 22 interacts with the various elements of the device. The cable 22 is preferably aircraft cable made of steel, but coated in plastic to reduce damage caused by the cable. The two looped and clamped ends 56 of cable represent the location where the cable ends mount on the flat side faces of the cable drums 36 and 38 before they are wound around the center spindles of the drums. Next, is a cable travel stop and limiter 58 which provides a contact point to stop the cable motion before the end of the cable is reached. The cable 22 then extends out from underneath the cable reel cover 14 and around the two pulleys 24 which are mounted near the bottom edge of motor-driven base 12. Next, the cable wraps around the perimeter of the carts using the holes 60 in the two cable guides 26 to direct the cable's path. The cable guides 26 are mounted longitudinally across the open basket of a shopping cart near the cart's handle pushed by the consumer. These two guides can be placed on any carts which would enable a more effective path around the cart perimeter. (See FIG. 1.)

The cable guides 26 are each comprised of a solid, metal rod which is roughly bent into a U-shape. The ends of the rod are curled back into loops 62 on both sides through which the cable 22 passes. Adjacent to the loops 62, the ends extend up at an angle before straightening and bending at a right angle over the open basket of the shopping cart. When the rod approaches the center, it extends up into a further long and narrow U-shaped bend 64. This design effectively fits over a shopping cart basket with a stable, yet easily movable, set of guides for cables stretching along the perimeter of a line of carts.

The cable 22 completes the loop around the perimeter of the carts by extending through a pull handle 28 that is adapted to be hooked to the handle on the rearmost shopping cart. This pull handle 28, shown in exploded form in FIG. 3, comprises edge plates 66, u-shaped couplers 68, a handle member 70, a bottom plate 72, and pulleys 74.

The pull handle 28 generally is a latching mechanism enabling the cable 22 to connect with the carts without significant frictional resistance. The pull handle 28 allows the cable to move from left to right to equalize tension. The pulleys 74 act as low friction bearings to ensure minimal movement of the cable. The pull handle 28 is attached to the last shopping cart in a line of pulled carts by hooking the curved couplers 68 over the shopping cart's handle. Because most forces will be directed contrary to this interaction, the curved coupler 68 typically bears most of the load directed by the carts. Between the curved couplers 68 is a large handle 70. This handle enables the user to easily add carts to the end of the line, then to quickly move the pull handle 28 to the handle of the last shopping cart in the string. L-shaped edge plates 66 are also attached to the sides of the pull handle 28 so that it will not slide off the cart handle due to side-to-side forces. These forces can be caused during the moving of carts when a turn is made by the cart string. During turns, the extra cable required at the outside of the turn is pulled through the inside pulley of the pull handle 28. The pulleys 74 of the pull handle 28 are placed at the front edges of the panel bottom plate 72. On the top of the cable pull handle 28 is a visibility flag 32 (FIG. 1) which is mounted by an angled bracket. This flag is intended to make the string of carts more easily recognizable to motorists in the parking lot.

Figure 4:
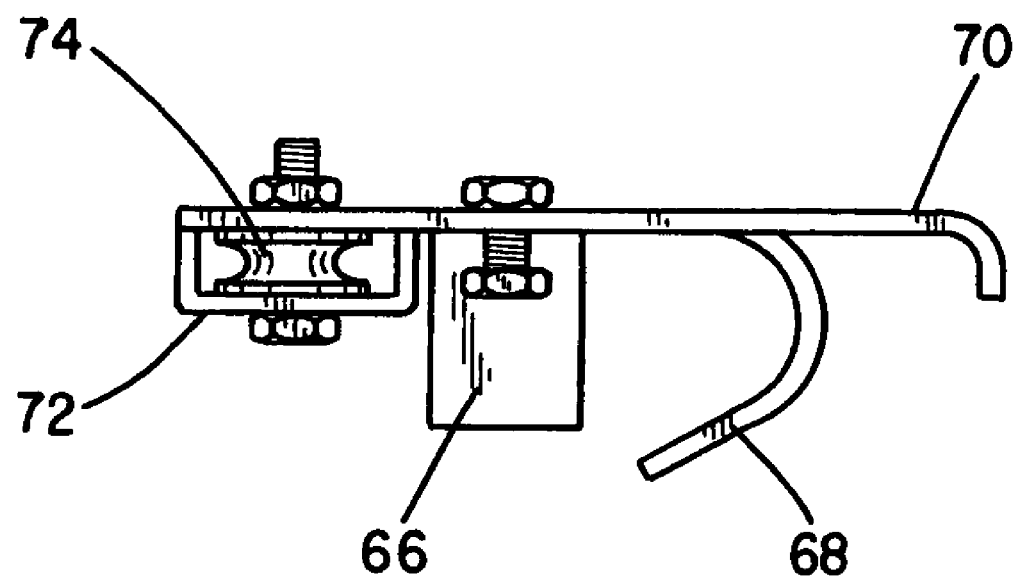
FIG. 4 is a side view of the cable pull handle.

FIG. 4 shows a side view of the pull handle assembly 28. It is important to note that the cable 22 will extend around the pulleys 74 which are mounted within the front portion of the handle. Also observed here is the shape and configuration of the edge plates 66, couplers 68, handle 70, and bottom plate 72.

Figure 5:
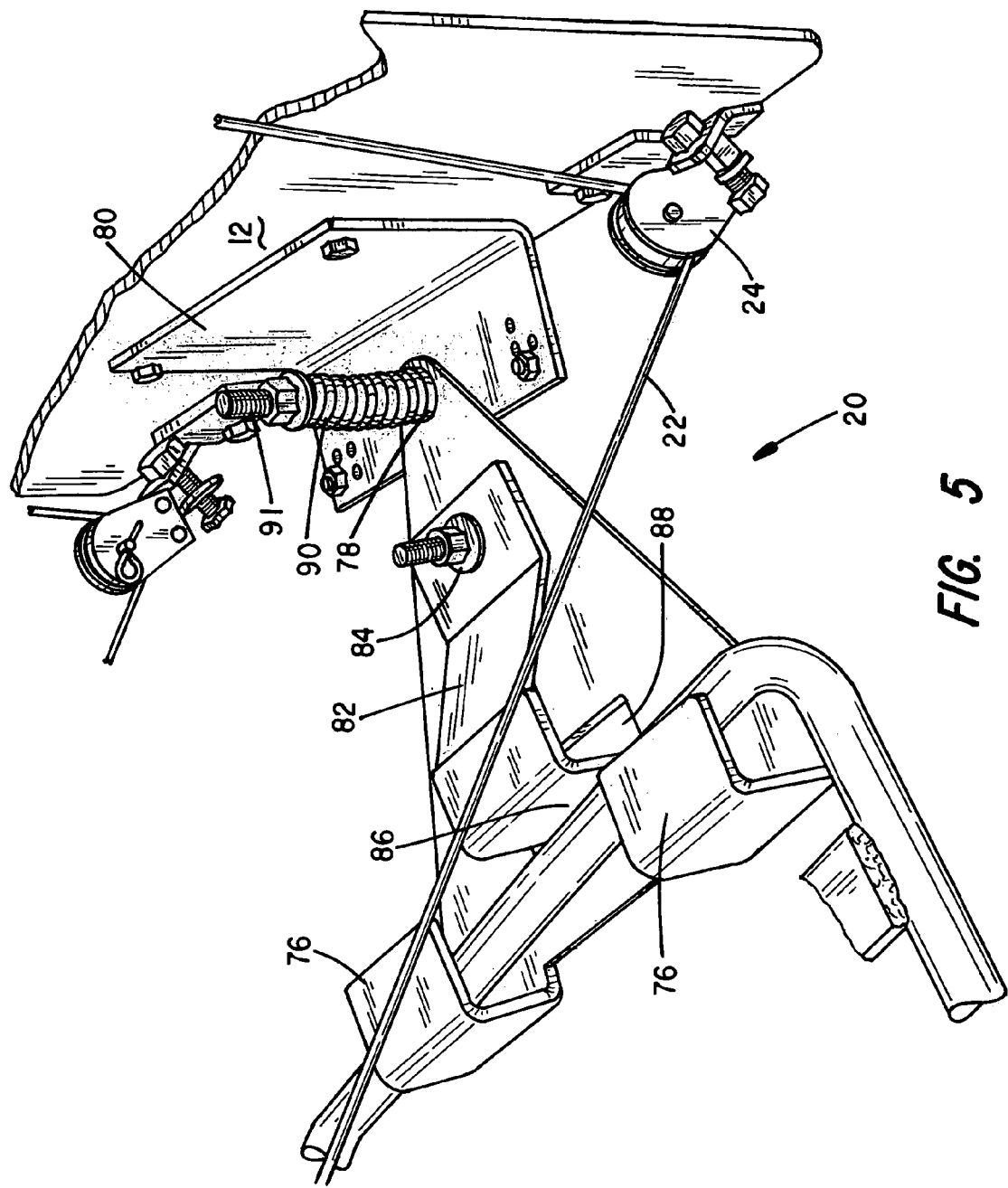
FIG. 5 is a perspective view of the cart hitch used to couple the vehicle to the lead shopping cart.

With reference to FIG. 5, a perspective view of a cart hitch 20 is shown. This hitch is generally a triangular-shaped piece of metal containing two C-shaped hooks 76 looping up from the sides of the base of the triangular metal piece. The apex of the triangle has a hole 78 through which a spring mounted bolt passes to an angled bracket 80 secured on the motor-driven base 12. There is a second sheet metal piece 82 that forms a latch or detent. It is bolted to the middle of the hitch at a hole 84. It angles up from its attachment before bending downward to form a blocking panel 86. This panel is perpendicular to an opening 88 in the triangular piece and may be pushed down against the force of a return spring (not shown) positioned between the triangular plate and the detent 82. When the blocking panel 86 is pushed down, the bottom bar of the first shopping cart in a line can be slid into the c-shaped hooks 76. When the blocking panel 86 is released, the bottom bar of the shopping cart will be prevented from moving outside the confines of the c-shaped hooks 76. The action of holding the first cart allows steering of the other carts as long as each cart in the string remains nested into the cart preceding it. The cart hitch 20 is spring loaded by axially mounting a spring 90 on a bolt 91 extending through angle plate 80 and hole 78 in the triangular plate. This allows the cart to be slightly above or below the hitch connection to the pulling machine during driving over uneven ground.

Also, seen in FIG. 5 is a more detailed perspective of the pulleys 24 which are used to route the cable 22 as it comes out from underneath the cable reel cover 14. Routing the cable downward from the cable drums 36 and 38 and around pulleys 24 helps to prevent lifting of the drive wheels of the cart pulling vehicle. Directing the forces downward in this way provides greater traction than if the cable were routed directly from the drums 36 and 38 to the pull handle.

Figure 6:
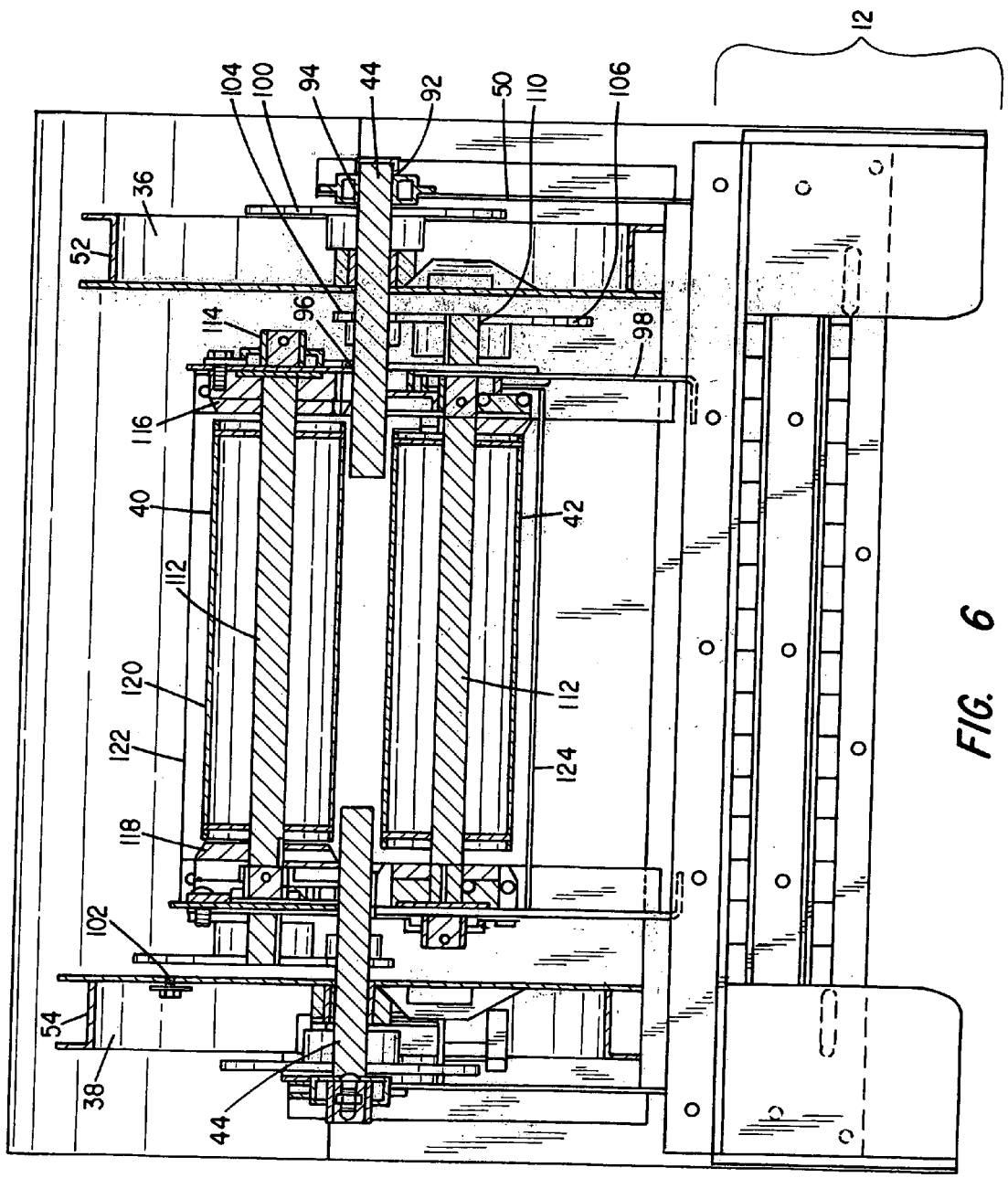
FIG. 6 is a cross-sectional frontal view of the internal machine layout.

FIG. 6 shows a cross-sectional frontal view of the internal machine layout. In the figure, mounting brackets 50 are bolted to each side of the motor-driven base 12. These brackets are roughly U-shaped pieces of sheet metal with legs which bolt to the base 12 and have a hole 92 centrally located. Bearings 94 are placed within holes 92 of the mounting brackets 50. Axially mounted though the bearings 94, on each side of the assembly, are drum shafts 44. The two drum shafts 44 are axially aligned, although each shaft extends about one-third of the width of the assembly with a gap in between. (See FIG. 10) The shafts are additionally supported on bearings 96, which are held in place by another set of brackets 98. Shafts 44 contain square keys which protrude slightly out from their circumference. This feature allows for a locked connection with the sprockets 100 and drums 36 and 38 which are axially engaged around the keyed shaft 44.

Sprockets 100 and cable drums 36 and 38 are axially mounted on the drum shaft 44 between the bearings 94 and 96. The sprockets 100 have a plurality of teeth and are critical components of the locking mechanism of the assembly. (See FIG. 7.) The cable drums 36 and 38 comprise a pair of circular flanges on each side of a spindle 52, 54 on which the cable 22 is wound. The outside flat surface flanges of the drums contain a bolt 102 onto which the ends of the cable 22 are secured. One end of the cable is affixed to the outside of the first cable drum 36 and the other end mounted on the outside of the second cable drum 38. The center hole of these cable drums and sprockets 100 are all adapted to axially engage around the keyed drum shafts 44. (see FIG. 7)

Looking again at FIG. 6, a smaller diameter sprocket 104 is mounted on each of the drum shafts 44, just inside the location of the cable drums 36 and 38. These sprockets 104 have a keyed center mount and are transversely aligned with sprockets 106. A drive chain 108 (not shown) is engaged around both sprocket 104 and sprocket 106. (see FIG. 8)

Sprockets 106 are both part of the spring shaft assembly. These sprockets 106 are located on opposite sides of the assembly from one another and are displaced vertically from one another. Sprockets 106 have keyed center holes 110. It is important to note that while the center axis of the two holes 110 are simply vertically displaced from one another, these are both vertically and horizontally displaced from the axis that runs through the center of drum shaft 44 (see FIG. 8). Sprockets 106 serve to rotate spring shafts 112. These spring shafts 112 span the gap between the two brackets 98 and are rotationally mounted within bearings 114 in each side of bracket 98. Inside the confines of the brackets 98, there are hub 116 and 118 on each side of the shaft 112. The hubs each contain a hole into which an end of the spring 40 or 42 is fit. The hub 116, on the side furthest from the sprocket 106, is bolted into place and remains non-rotatable. The hub drive 118, nearest the sprocket 106 has its center hole keyed to the spring shaft 112 and is capable of being rotated, causing the shaft 112 to rotate when the sprocket 106 is driven. This serves to store energy in the spring. There is a hollow spring support tube 120 extending between the ends of the hub drives 116 and 118. Springs 40 and 42 encircling the spring support tubes 120. These springs are the mechanisms responsible for generating the required tension in the cable 22 for securing the shopping carts. (See FIG. 9)

Also seen in FIG. 6 are braces 122 and 124, which generally are metal bars that run longitudinally between the brackets 98 near the top and bottom of the spring shaft assembly. These braces 122 and 124 are attached with bolts through their angled ends. They generally provide increased stability and support to the assembly.

Figure 7:
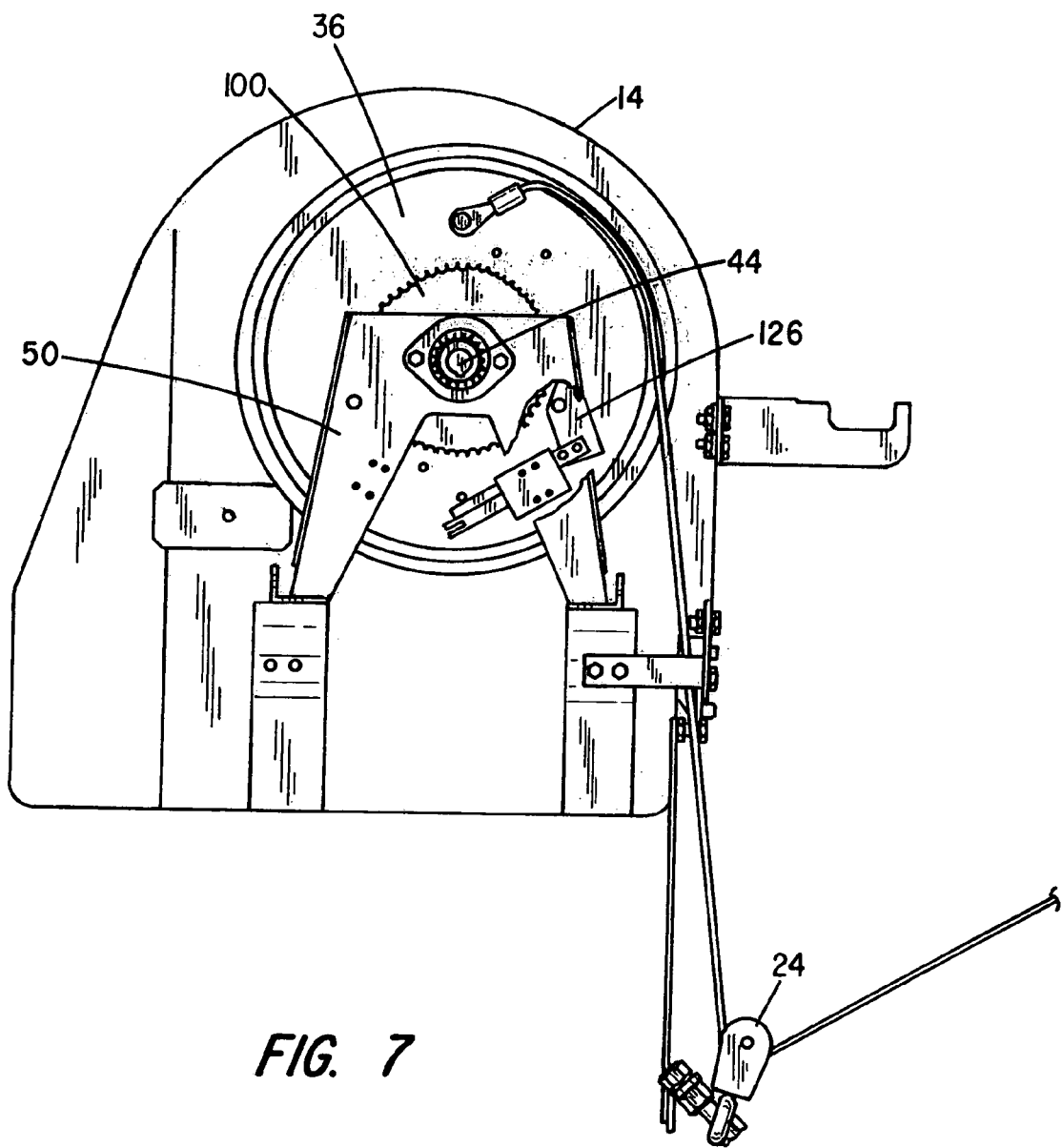
FIG. 7 is a partial side view of the internal machine parts.

Now referring to FIG. 7, a partial inside side view of internal machine parts is shown. This figure discloses a excellent perspective of the cable attachment to drum 36 and cable routing under the cable reel cover 14 and around pulley 24. This figure also shows the outline of one of the brackets 50 upon which the drum shaft 44 is centrally mounted. A cable drum lock 126, used to engage with the sprocket 100 to halt cable movement when the vehicle is in motion is seen here as well. This cable drum lock 126 is solenoid controlled by an electric motor driver that provides a signal which the circuit uses to control the lock and unlock action of a locking pawl.

Figure 8:
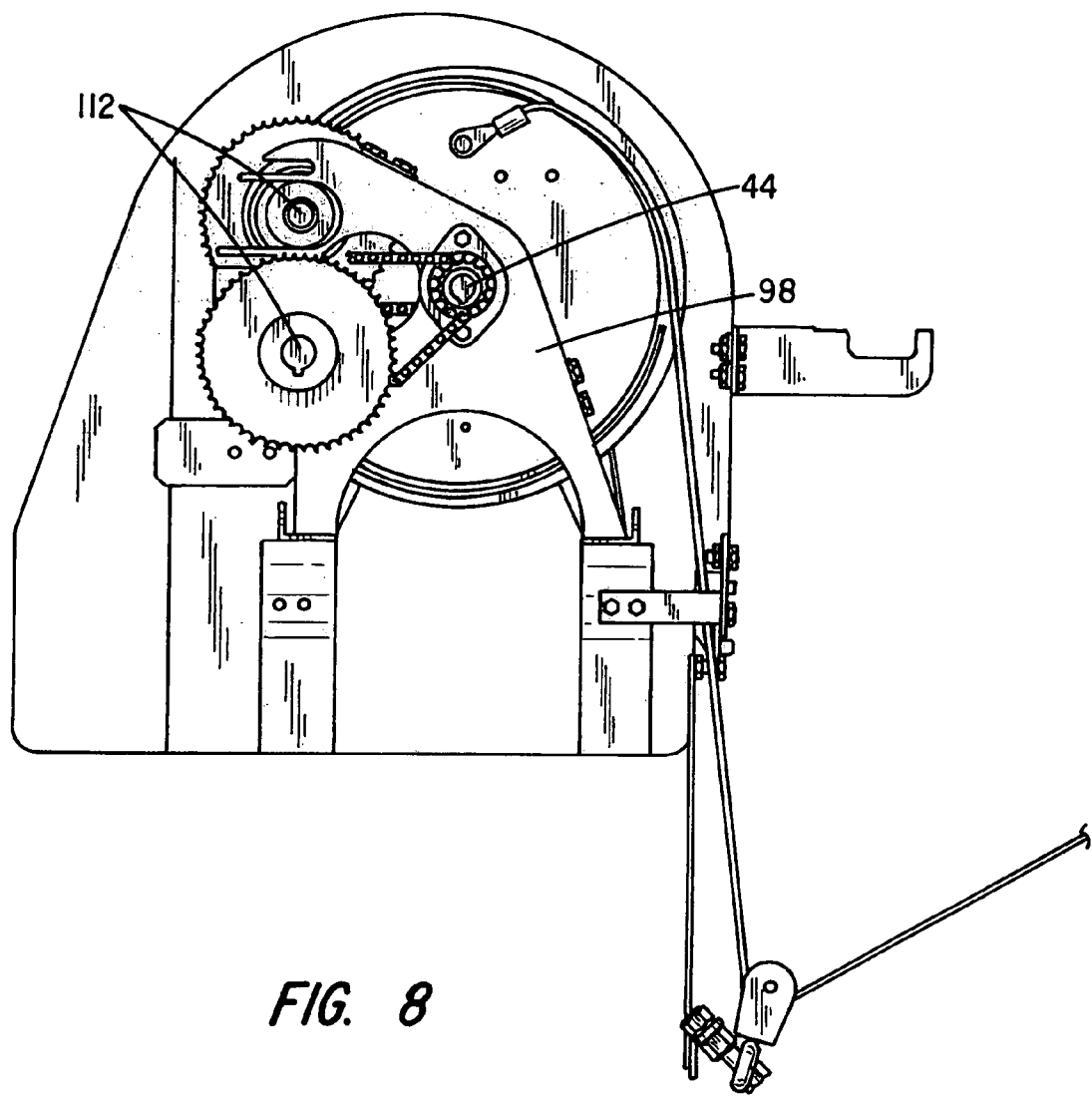
FIG. 8 is a partial side view of the internal machine parts.

Now referring to FIG. 8, a partial inside side view of internal machine parts is shown. This figure discloses a cross-section of parts seen if one were to hypothetically remove the nearest cable drum and support bracket of FIG. 7. This is a useful cross-section denoting the locations of the axis of both spring shafts 112 as well as the drum shaft 44 and the chain linking the two. A side view of bracket 98 is also disclosed. The bracket 98 contains three shaft openings for the spring and drum shafts. The openings for the spring shafts are rounded horizontal slots into which shafts are inserted, and the drum shaft opening is a centrally located hole.

Figure 9:
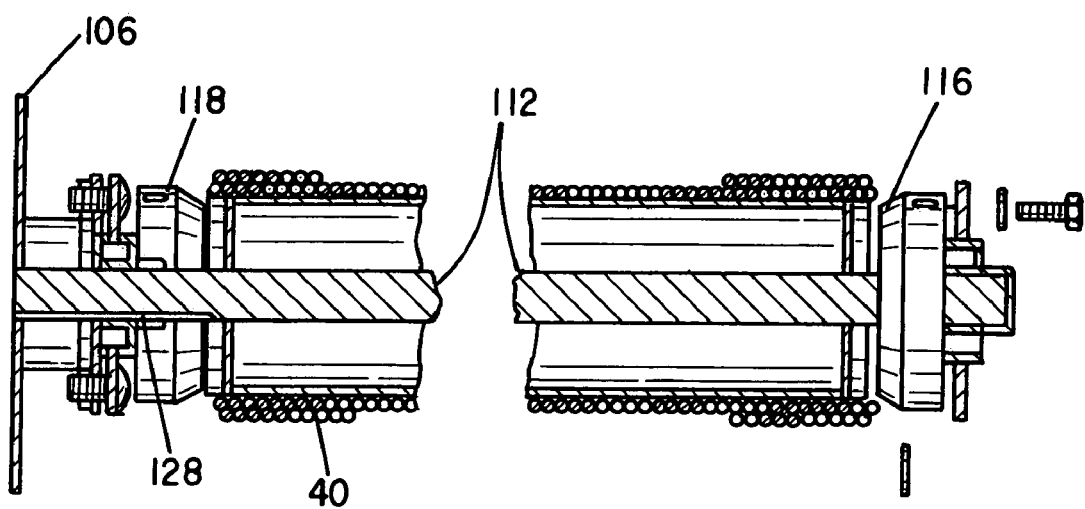
FIG. 9 is a cross-sectional view of the spring shaft assembly.

FIG. 9 shows a cross-sectional view of the spring shaft assembly. The figure discloses a shortened spring 40 which enables view of the end fittings. Also seen here is how the end of the shaft nearest the hub drive 118 uses a square key fitting 128. In the actual assembly of the cable drum and tensioning mechanism, there are two spring shaft assemblies of the type illustrated in FIG. 9. One of these assemblies is turned 180 degrees and is mounted above the other. Because the spring assemblies are on discrete shafts that overlap in spanning the width dimension of the vehicle, the vehicle can be of a reduced width allowing it to be no wider than the shopping carts being pulled. This allows easier passage through doors of the commercial establishment. Where a wider cart profile can be tolerated, the cable springs 40 and 42 can be mounted on the same shaft as an associated drum 36 and 38. That is, spring 42 can be mounted on shaft 44 on which drum 36 is offered the shaft supporting cable spring 40. In this way, the chains and sprockets can be eliminated.

Figure 10:
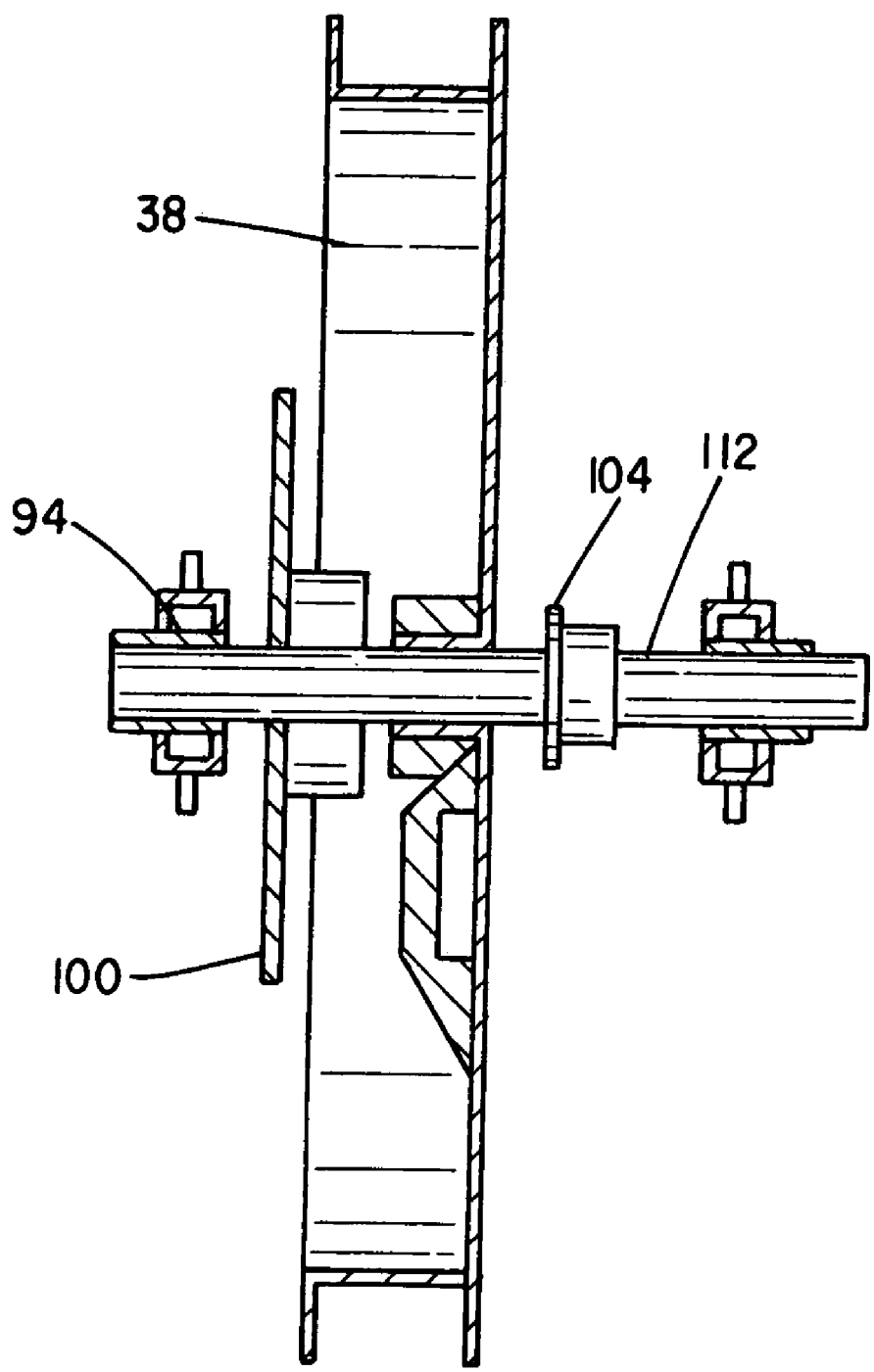
FIG. 10 is a cross-sectional view of the drum shaft assembly.

FIG. 10 is a cross-sectional view of the drum shaft assembly. In this device there are two drum shaft assemblies like the one shown. One is turned 180 degrees from the one shown in FIG. 10, but the axis of both of the drum shaft assemblies are aligned axially.

The operation of the cart pulling vehicle with dual cable drums and dual torsion springs is as follows. First, an operator first moves the cart pulling vehicle into the parking lot to the location of a shopping cart using the handle controls 18 which lead to the motor that drives the cart. The pull handle and cable guides are initially held on the handle guide and storage bracket 30. The first cart is attached by inserting the cart's lower bar in the c-shaped hooks 76 of the cart hitch 20. All additional carts are stacked into a line by partially nesting the basket of one into the cart in front of it. Next, the cable pull handle 28 is extended and hooked on the handle of the last cart in the line. Cable guides 26 are placed across the baskets of some of these carts to ensure the cable encircles the carts with a minimum of contact with the sides of the carts. Once the propelling machine has surrounded a variable number of carts with a cable 22, the vehicle control is activated by the operator to move the vehicle. The locking solenoid device 126 locks the drums 36 and 38, preventing playout of the cable 22 as the machine moves the carts to a new location. Once the machine has stopped, the solenoid latch 126 is released to allow the cable to be pulled from the drums so that carts can be added or removed. The operator has the ability, at any time the machine is not moving, to move the cable in or out with little effort based upon the spring design. The attachment and design of the cable guide 26 and cable pull handle 28 allows addition of carts without moving the cable pull handle 28 until after the carts have been added. Additional controls allow locking the cable so that the cable drum lock does not disengage when the machine has stopped. This feature provides additional control of the cart motion for the operator when moving the machine, device and carts from the collection area of the parking lot to the use or storage areas.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself

What is claimed is:

1. A motorized vehicle for pulling a string of nested shopping carts comprising, in combination:
   (a) a motor-driven base having at least three wheels;
   (b) a frame supported on said base;
   (c) first and second reel assemblies mounted on separate shafts, said shafts being journaled for rotation on said frame;
   (d) an elongated, flexible tether having one end thereof affixed to the first reel assembly and a second end affixed to the second reel assembly, the tether adapted to be wrapped onto and drawn from the first and second reel assemblies and having a coupling disposed along the length of the tether and adapted to engage a last shopping cart in the string of nested shopping carts; and
   (e) first and second helical springs mounted in vertical and parallel relationship to one another and being operatively coupled individually to the separate shafts to store energy when the tether is pulled off the reel's assembly and to release energy for rewinding the tether on said reel assemblies.

2. The motorized vehicle as in claim 1 wherein the tether is a multistrand cable.

3. The motorized vehicle as in claim 2 wherein the multistrand cable has a polymer covering thereon.

4. The motorized vehicle as in either claim 2 or claim 3 wherein the cable is comprised of metal strands.

5. The motorized vehicle as in claim 1 and further including a lock mechanism affixed to the first and second shafts that inhibits playout of the tether from the first and second reel assemblies while the motorized vehicle is in motion.

6. The motorized vehicle as in claim 1 wherein at least one wheel is steerable.

7. The motorized vehicle as in claim 1 wherein the separate shafts are axially aligned across a width dimension of the base.

8. The motorized vehicle as in claim 1 wherein the first and second helical springs are mounted in surrounding relation to first and second shafts that are journaled for rotation on said frame, said first and second helical springs each having one end thereof coupled to the one of the first and second shafts on which the first and second helical springs is mounted.

9. The motorized vehicle as in claim 8 wherein the separate shafts on which the first and second reel assemblies are mounted each have a sprocket wheel affixed thereto and the first and second shafts on which the first and second helical springs are mounted, each have a sprocket wheel affixed thereto, and further including endless chains coupling the sprocket wheels on the separate shafts on which the first and second reel assemblies are mounted to the sprocket wheels affixed to the first and second shafts on which the first and second helical springs are mounted.

10. The motorized vehicle as in claim 1 and further including at least one guiding member adapted to be mounted on a shopping cart in said string of nested shopping carts for guiding the tether along and in spaced relation to the string of shopping carts.

11. The motorized vehicle as in claim 10 and further including a pair of pulleys affixed to said base at a location proximate a level of said wheels with the tether being routed over said pair of pulleys before engaging the at least one guiding member.

12. The motorized vehicle as in claim 11 and further including a pair of pulleys mounted on opposed ends of the coupling with the tether being routed over the pair of pulleys that are mounted on said coupling.

13. The motorized vehicle as in claim 5 wherein the lock mechanism includes solenoid actuatable pawls for selectively engaging teeth on toothed wheels, said toothed wheels affixed to the separate shafts on which the first and second reel assemblies are mounted.

14. The motorized vehicle as in claim 1 and further including a hitch assembly affixed to the motor-driven base and adapted to be coupled to a bottom frame member of a lead shopping cart in the string of nested shopping carts.

15. The motorized vehicle as in claim 14 wherein the hitch assembly includes a first member rigidly attached to the motor-driven base and a second member pivotally attached to the first member, the second member having a manually-operated latch for releasably grasping the bottom frame member of said lead shopping cart.

16. The motorized vehicle as in claim 15 and further including a pivot pin and a coil spring surrounding the pivot pin and resiliently forcing the second member against the first member.

17. A motorized vehicle for pulling a string of nested shopping carts comprising, in combination:
   (a) a motor-driven base having at least three wheels;
   (b) a frame supported on said base;
   (c) first and second reel assemblies mounted on separate shafts, said shafts being journaled for rotation on said frame;
   (d) an elongated, flexible tether having one end thereof affixed to the first reel assembly and a second end affixed to the second reel assembly, the tether adapted to be wrapped onto and drawn from the first and second reel assemblies and having a coupling disposed along the length of the tether and adapted to engage a last shopping cart in the string of nested shopping carts; and
   (e) first and second helical springs mounted in surrounding relation to first and second shafts that are journaled for rotation on said frame, said first and second helical springs each having one end thereof coupled to the one of the first and second shafts on which the first and second helical springs is mounted to store energy when the tether is pulled off the reel's assembly and to release energy for rewinding the tether on said reel assemblies.

18. The motorized vehicle as in claim 17 wherein the tether is a multistrand cable.

19. The motorized vehicle as in claim 18 wherein the multistrand cable has a polymer covering thereon.

20. The motorized vehicle as in either claim 18 or claim 19 wherein the cable is comprised of metal strands.

21. The motorized vehicle as in claim 17 and further including a lock mechanism affixed to the first and second shafts that inhibits playout of the tether from the first and second reel assemblies while the motorized vehicle is in motion.

22. The motorized vehicle as in claim 17 wherein at least one wheel is steerable.

23. The motorized vehicle as in claim 17 wherein the separate shafts are axially aligned across a width dimension of the base.

24. The motorized vehicle as in claim 17 wherein the first and second helical springs are disposed primarily in parallel and vertical relation to one another.

25. The motorized vehicle as in claim 17 wherein the separate shafts on which the first and second reel assemblies are mounted each have a sprocket wheel affixed thereto and the first and second shafts on which the first and second helical springs are mounted, each have a sprocket wheel affixed thereto, and further including endless chains coupling the sprocket wheels on the separate shafts on which the first and second reel assemblies are mounted to the sprocket wheels affixed to the first and second shafts on which the first and second helical springs are mounted.

26. The motorized vehicle as in claim 17 and further including at least one guiding member adapted to be mounted on a shopping cart in said string of nested shopping carts for guiding the tether along and in spaced relation to the string of shopping carts.

27. The motorized vehicle as in claim 26 and further including a pair of pulleys affixed to said base at a location proximate a level of said wheels with the tether being routed over said pair of pulleys before engaging the at least one guiding member.

28. The motorized vehicle as in claim 27 and further including a pair of pulleys mounted on opposed ends of the coupling with the tether being routed over the pair of pulleys that are mounted on said coupling.

29. The motorized vehicle as in claim 21 wherein the lock mechanism includes solenoid actuatable pawls for selectively engaging teeth on toothed wheels, said toothed wheels affixed to the separate shafts on which the first and second reel assemblies are mounted.

30. The motorized vehicle as in claim 17 and further including a hitch assembly affixed to the motor-driven base and adapted to be coupled to a bottom frame member of a lead shopping cart in the string of nested shopping carts.

31. The motorized vehicle as in claim 30 wherein the hitch assembly includes a first member rigidly attached to the motor-driven base and a second member pivotally attached to the first member, the second member having a manually-operated latch for releasably grasping the bottom frame member of said lead shopping cart.

32. The motorized vehicle as in claim 31 and further including a pivot pin and a coil spring surrounding the pivot pin and resiliently forcing the second member against the first member.

33. A motorized vehicle for pulling a string of nested shopping carts comprising, in combination:
(a) a motor-driven base having at least three wheels;
(b) a frame supported on said base;
(c) first and second reel assemblies mounted on separate shafts, said shafts being journaled for rotation on said frame;
(d) an elongated, flexible tether having one end thereof affixed to the first reel assembly and a second end affixed to the second reel assembly, the tether adapted to be wrapped onto and drawn from the first and second reel assemblies and having a coupling disposed along the length of the tether and adapted to engage a last shopping cart in the string of nested shopping carts;
(e) first and second helical springs operatively coupled individually to the separate shafts to store energy when the tether is pulled off the reel's assembly and to release energy for rewinding the tether on said reel assemblies;
(f) at least one guide member adapted to be mounted on a shopping cart in said string of nested shopping carts for guiding the tether along and in spaced relation to the string of shopping carts; and
(g) a pair of pulleys affixed to said base at a location proximate a level of said wheels with the tether being routed over said pair of pulleys before engaging the at least one guiding member.

34. The motorized vehicle as in claim 33 wherein the tether is a multistrand cable.

35. The motorized vehicle as in claim 34 wherein the multistrand cable has a polymer covering thereon.

36. The motorized vehicle as in either claim 33 or claim 34 wherein the cable is comprised of metal strands.

37. The motorized vehicle as in claim 33 and further including a lock mechanism affixed to the first and second shafts that inhibits playout of the tether from the first and second reel assemblies while the motorized vehicle is in motion.

38. The motorized vehicle as in claim 33 wherein at least one wheel is steerable.

39. The motorized vehicle as in claim 33 wherein the separate shafts are axially aligned across a width dimension of the base.

40. The motorized vehicle as in claim 33 wherein the first and second helical springs are disposed primarily in parallel and vertical relation to one another.

41. The motorized vehicle as in claim 40 wherein the first and second helical springs are mounted in surrounding relation to first and second shafts that are journaled for rotation on said frame, said first and second helical springs each having one end thereof coupled to the one of the first and second shafts on which the first and second helical springs is mounted.

42. The motorized vehicle as in claim 41 wherein the separate shafts on which the first and second reel assemblies are mounted each have a sprocket wheel affixed thereto and the first and second shafts on which the first and second helical springs are mounted, each have a sprocket wheel affixed thereto, and further including endless chains coupling the sprocket wheels on the separate shafts on which the first and second reel assemblies are mounted to the sprocket wheels affixed to the first and second shafts on which the first and second helical springs are mounted.

43. The motorized vehicle as in claim 33 and further including a pair of pulleys mounted on opposed ends of the coupling with the tether being routed over the pair of pulleys that are mounted on said coupling.

44. The motorized vehicle as in claim 37 wherein the lock mechanism includes solenoid actuatable pawls for selectively engaging teeth on toothed wheels, said toothed wheels affixed to the separate shafts on which the first and second reel assemblies are mounted.

45. The motorized vehicle as in claim 33 and further including a hitch assembly affixed to the motor-driven base and adapted to be coupled to a bottom frame member of a lead shopping cart in the string of nested shopping carts.

46. The motorized vehicle as in claim 45 wherein the hitch assembly includes a first member rigidly attached to the motor-driven base and a second member pivotally attached to the first member, the second member having a manually-operated latch for releasably grasping the bottom frame member of said lead shopping cart.

47. The motorized vehicle as in claim 46 and further including a pivot pin and a coil spring surrounding the pivot pin and resiliently forcing the second member against the first member.

* * * * *